US009734438B2

(12) United States Patent
Hosaka

(10) Patent No.: US 9,734,438 B2
(45) Date of Patent: Aug. 15, 2017

(54) IMAGE PROCESSING METHOD, IMAGE PROCESSING APPARATUS, AND COMPUTER PROGRAM PRODUCT

(71) Applicant: Shigetoshi Hosaka, Kanagawa (JP)

(72) Inventor: Shigetoshi Hosaka, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/635,148

(22) Filed: Mar. 2, 2015

(65) Prior Publication Data
US 2015/0254536 A1   Sep. 10, 2015

(30) Foreign Application Priority Data

Mar. 4, 2014 (JP) ................................ 2014-042165

(51) Int. Cl.
*G06K 15/02* (2006.01)
*G06F 3/12* (2006.01)

(52) U.S. Cl.
CPC ..... *G06K 15/1873* (2013.01); *G06K 15/1868* (2013.01)

(58) Field of Classification Search
None
See application file for complete search history.

(56) References Cited

U.S. PATENT DOCUMENTS

| | | | | |
|---|---|---|---|---|
| 4,847,641 A * | 7/1989 | Tung | ...................... | G06K 15/02 347/131 |
| 5,041,848 A * | 8/1991 | Gilbert | ................. | G06K 15/128 347/251 |
| 5,465,157 A * | 11/1995 | Seto | .................... | G06K 15/1874 358/3.15 |
| 5,586,227 A * | 12/1996 | Kawana | .................. | G06K 15/00 358/1.13 |
| 5,650,858 A * | 7/1997 | Lund | ....................... | G06T 3/403 347/5 |
| 5,706,046 A * | 1/1998 | Eki | ..................... | H04N 1/40037 347/131 |
| 5,742,317 A * | 4/1998 | Kashihara | .............. | G06K 15/00 347/131 |
| 5,990,924 A * | 11/1999 | Kido | .................... | G06K 15/128 347/131 |
| 6,106,093 A * | 8/2000 | Nagoshi | ............... | H04N 1/3871 347/15 |
| 6,377,710 B1 * | 4/2002 | Saund | ..................... | G06K 9/44 382/242 |

(Continued)

FOREIGN PATENT DOCUMENTS

JP    2006-326913    12/2006

*Primary Examiner* — Beniyam Menberu
(74) *Attorney, Agent, or Firm* — Cooper & Dunham LLP

(57) ABSTRACT

An image processing method generates image data of an image made up of a plurality of dots and having resolution in a first direction and resolution in a second direction. The second direction intersects the first direction. The resolution in the first direction is different from the resolution in the second direction. The image processing method includes performing contour portion correction including adding a dot at a correction target pixel, the correction target pixel being a pixel adjacent to a step-like contour portion in the image, and when a dot is arranged at a pixel adjacent to a pixel of interest adjacent to the correction target pixel, deleting the dot at the pixel of interest.

9 Claims, 7 Drawing Sheets

(56) References Cited

U.S. PATENT DOCUMENTS

| | | | |
|---|---|---|---|
| 7,145,694 B2* | 12/2006 | Suzuki | H04N 1/409 358/2.1 |
| 2001/0021035 A1* | 9/2001 | Takashimizu | H04N 1/4052 358/1.9 |
| 2002/0070990 A1* | 6/2002 | Yamasaki | B41J 2/2121 347/15 |
| 2003/0026496 A1* | 2/2003 | Nou | H04N 1/4092 382/264 |
| 2004/0239958 A1* | 12/2004 | Nagata | G06K 15/02 358/1.2 |
| 2007/0165280 A1* | 7/2007 | Yago | G06F 17/30253 358/2.99 |
| 2008/0018919 A1* | 1/2008 | Ohkawa | G06T 7/0085 358/1.9 |
| 2008/0304108 A1 | 12/2008 | Kimura | |
| 2009/0195585 A1* | 8/2009 | Satoh | B41J 2/2107 347/15 |
| 2010/0265549 A1* | 10/2010 | Kashibuchi | H04N 1/4092 358/3.06 |

* cited by examiner

POINT OF INTEREST

POINT OF INTEREST

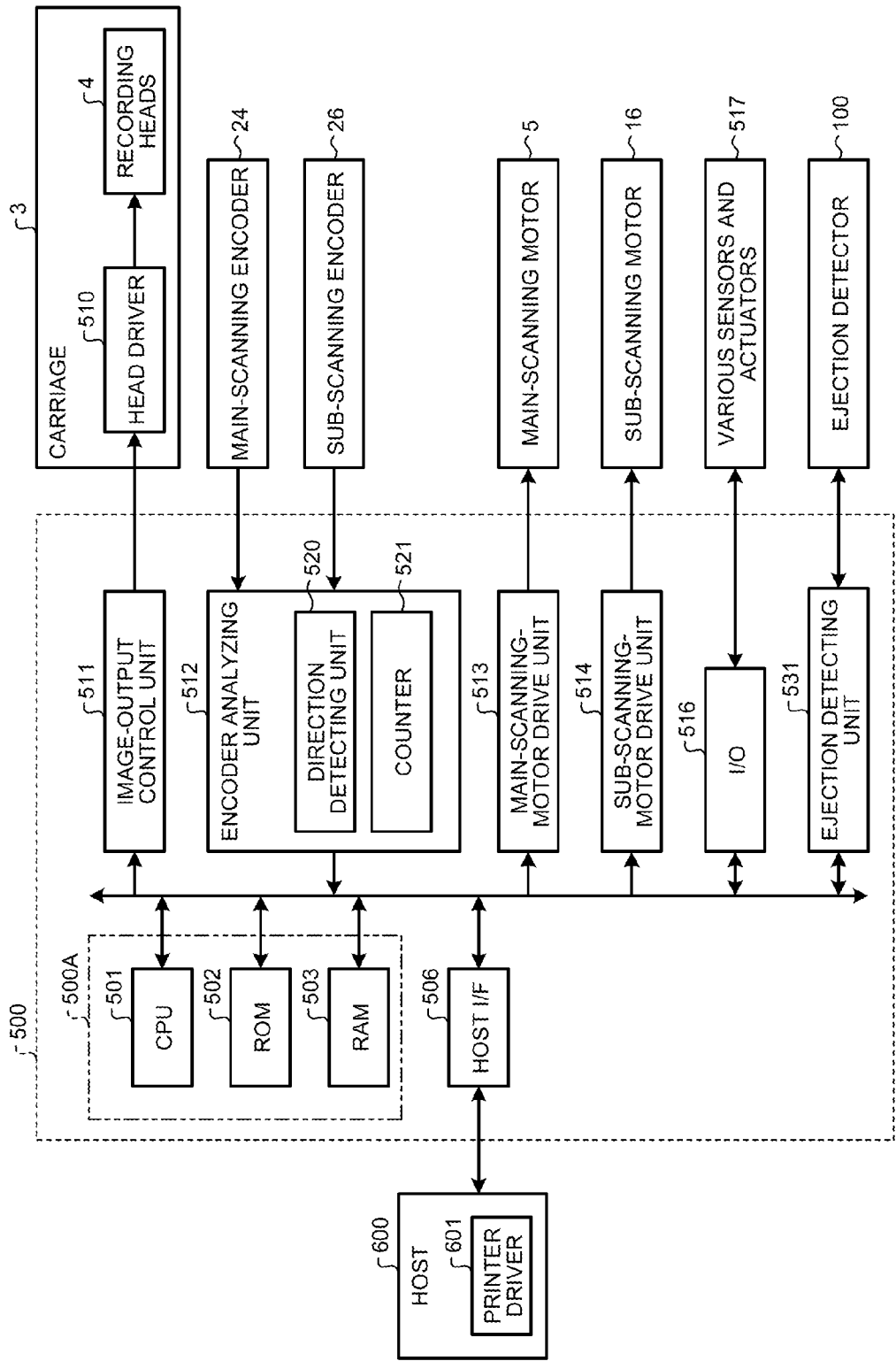

IMAGE PROCESSING METHOD, IMAGE PROCESSING APPARATUS, AND COMPUTER PROGRAM PRODUCT

CROSS-REFERENCE TO RELATED APPLICATIONS

The present application claims priority to and incorporates by reference the entire contents of Japanese Patent Application No. 2014-042165 filed in Japan on Mar. 4, 2014.

BACKGROUND OF THE INVENTION

1. Field of the Invention

The present invention relates generally to an image processing method, an image processing apparatus, and a computer program product.

2. Description of the Related Art

As an image forming apparatus such as a printer, a facsimile, a copier, a plotter, or a multifunction peripheral having functions of two or more of these apparatuses, an inkjet recording apparatus that is one type of liquid-ejection-recording-type image forming apparatus including, as a recording head, a liquid ejection head which ejects liquid droplets are known, for example.

In a low-resolution image printed by such an inkjet recording apparatus, what is generally referred to as jaggy in which a contour portion has a jagged shape, can appear at a contour portion of a character or a line containing an oblique line. The jaggy is caused by dots arranged in a step-like pattern at the contour portion.

It has been conventionally known that a step-like portion of a contour portion is detected, and addition of or replacement with a small dot is performed when printing an image in which the value of resolution in the main-scanning direction differs from that in the sub-scanning direction (Japanese Laid-open Patent Application No. 2006-326913).

However, the image portion to which a small dot is added is fattened. As a result, thickness of a character or a line to which the image portion belongs changes, which may result in a bump-like lump. When printing an image in which resolution in the main-scanning direction and that in the sub-scanning direction differ from each other, dot size is set based on the direction of lower resolution to prevent production of an anomalous image having a white spot at a solid portion or the like. However, this dot size is too large in the direction of higher resolution.

As a result, a problem arises that a jaggy correction (contour portion correction) of when printing an image with resolution in the main-scanning direction different from that in the sub-scanning direction deteriorates image quality of an oblique line extending in a direction close to the direction of higher resolution.

In view of the above circumstance, there is a need to enhance image quality of an image in which resolution in the main-scanning direction differs from that in the sub-scanning direction.

SUMMARY OF THE INVENTION

It is an object of the present invention to at least partially solve the problems in the conventional technology.

An image processing method generates image data of an image made up of a plurality of dots and having resolution in a first direction and resolution in a second direction. The second direction intersects the first direction. The resolution in the first direction is different from the resolution in the second direction. The image processing method includes performing contour portion correction including adding a dot at a correction target pixel, the correction target pixel being a pixel adjacent to a step-like contour portion in the image, and when a dot is arranged at a pixel adjacent to a pixel of interest adjacent to the correction target pixel, deleting the dot at the pixel of interest.

An image processing apparatus generates image data of an image made up of a plurality of dots and having resolution in a first direction and resolution in a second direction. The first direction intersects the second direction. The resolution in the first direction is different from the resolution in the second direction. The image processing apparatus is configured to perform contour portion correction including adding a dot at a correction target pixel, the correction target pixel being a pixel adjacent to a step-like contour portion in the image, and when a dot is arranged at a pixel adjacent to a pixel of interest adjacent to the correction target pixel, deleting the dot at the pixel of interest.

A computer program product includes a non-transitory computer-readable medium containing an information processing program. The program causes a computer to perform image processing that generates image data of an image made up of a plurality of dots and having resolution in a first direction and resolution in a second direction intersecting the first direction. The resolution in the first direction is different from the resolution in the second direction. The image processing includes performing contour portion correction including adding a dot at a correction target pixel, the correction target pixel being a pixel adjacent to a step-like contour portion in the image, and when a dot is arranged at a pixel adjacent to a pixel of interest adjacent to the correction target pixel, deleting a dot at the pixel of interest.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a block diagram illustrating an overview of a control unit of the image forming apparatus illustrated in FIG. 10.

DETAILED DESCRIPTION OF THE PREFERRED EMBODIMENTS

Figure 1:
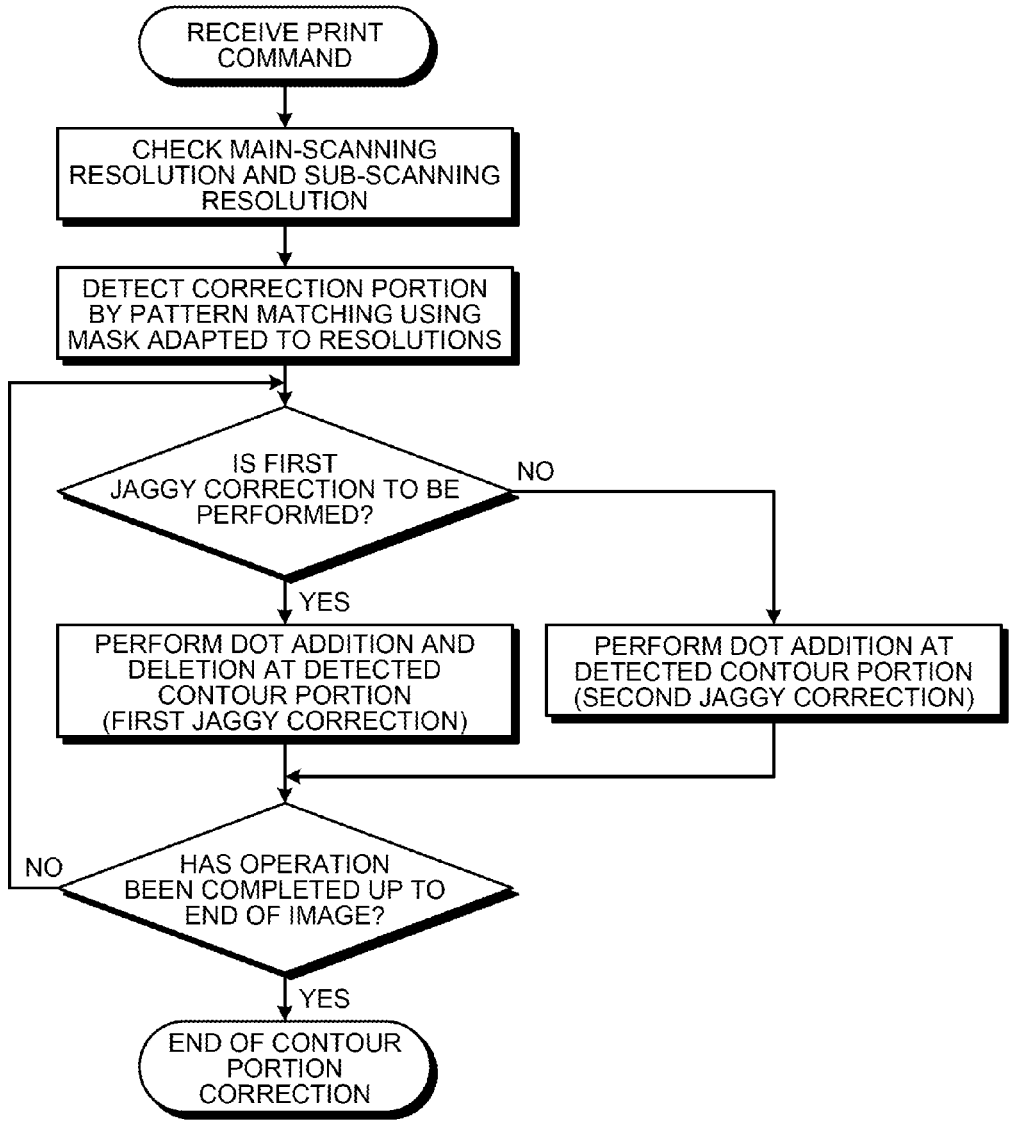
FIG. 1 is a flowchart for describing an image processing method according to an embodiment of the present invention.

Preferred embodiments of the present invention are described below with reference to the accompanying drawings. An image processing method according to an embodiment of the present invention is described below with reference to the flowchart illustrated in FIG. 1.

The term "main-scanning direction" as used herein refers to the direction in which a carriage of a serial-type image forming apparatus travels; the term "sub-scanning direction" refers to the direction in which a medium is conveyed. The sub-scanning direction intersects (in this specification, perpendicularly) the main-scanning direction. Unless otherwise specifically defined, the main-scanning direction, or the first direction, as used herein refers to the lateral direction on the plane of image data in each of the appended drawings; the sub-scanning direction, or the second direction, refers to the vertical direction in the same. An example in which image processing is performed in the image forming apparatus is described below.

Image data is received as a print command first. The image data is halftone-processed image data fed from an information processing apparatus (image processing apparatus) such as a personal computer.

In the halftone processing, 256 gray levels of an image represented by 8 bits, for example, are converted to gray levels which may be binary, ternary, or quaternary gray levels, for example, adapted to the image forming apparatus by, for example, the dithering method or the error diffusion method.

The image forming apparatus checks information about resolution of the received image data in the main-scanning direction (hereinafter, "main-scanning resolution") and that in the sub-scanning direction (hereinafter, "sub-scanning resolution").

The print command generally contains not only image data to be printed but also information about what size the image data is to be printed. Furthermore, the image data generally contains information about how many dots are in the main-scanning direction and in the sub-scanning direction. Accordingly, the main-scanning resolution and the sub-scanning resolution can be calculated from these pieces of information.

Alternatively, an approach in which the information processing apparatus causes the print command to contain information indicating the main-scanning resolution and the sub-scanning resolution in advance so that the information is transmitted together with the image data may be taken.

Thereafter, a step-like contour portion which is a target (i.e., a correction portion) of a jaggy correction, which is contour portion correction, is detected in accordance with the resolutions. The correction portion is detected by pattern matching using a mask pattern adapted to the resolution of the image data.

Thereafter, whether or not to perform a jaggy correction (hereinafter, the "first jaggy correction") according to the embodiment on the detected correction portion (the step-like contour portion) is determined. In the example described herein, whether or not to perform the first jaggy correction on the correction portion is determined from the "angle" and "thickness" of the step-like contour portion in a pattern detected by performing pattern matching.

If it is determined that the first jaggy correction is to be performed on the detected step-like contour portion, the first jaggy correction is performed on the step-like contour portion. In the first jaggy correction, a small dot is added at a correction target pixel, but when a dot is arranged at a pixel adjacent to a pixel of interest adjacent to the correction target pixel, processing of deleting the dot at the pixel of interest is performed.

On the other hand, if it is determined that the first jaggy correction is not to be performed on the detected step-like contour portion, a jaggy correction (hereinafter, the "second jaggy correction") which adds a small dot at the correction target pixel is performed.

When the jaggy correction has been performed on the step-like contour portions up to the end of the image, the processing ends.

By performing such contour portion correction as that described above, addition of a dot and deletion of an excessive dot to and from each oblique line in a low-resolution image in which main-scanning resolution and sub-scanning resolution differ from each other can be performed and jaggy correction of the character or line can be performed without adverse effect even for a thin oblique line having a small angle.

The contour portion correction processing described above may include processing of determining whether or not to perform the contour portion correction processing based on color information about the image data.

For instance, the contour portion correction processing may be configured such that when image data is made with four colors, KCMY (black, cyan, magenta, and yellow), the contour portion correction processing is performed only on the data for black (K) but not performed on the data for the other three colors. Alternatively, a configuration in which the contour portion correction processing is performed on data for three colors, KCM, by making use of a threshold of ink lightness may be employed.

Ten people assessed samples of oblique lines on which the contour portion correction processing according to the embodiment was performed and oblique lines on which only general dot addition and conversion were performed by visually comparing the samples. All the ten people evaluated as follows. In the image on which the contour portion correction processing according to the embodiment was performed, the image quality of oblique lines the angles of which were small was superior and that of the other oblique lines was equal.

A method for detecting the step-like contour portion (correction portion), which is involved in the contour portion correction processing described above, is described below with reference to FIGS. 2A and 2B.

Figure 2A:
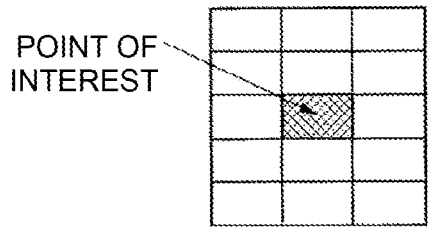
FIGS. 2A and 2B are explanatory diagrams for describing examples of a mask for use in detecting a step-like contour portion (correction portion)

FIG. 2A is an explanatory diagram for describing a mask with a size of 3×5 to be used in a situation where resolution in the main-scanning direction is half as high as that in the sub-scanning direction. In the example described below, the main-scanning resolution and the sub-scanning resolution are 300 dpi (dots per inch) and 600 dpi, respectively.

Figure 2B:
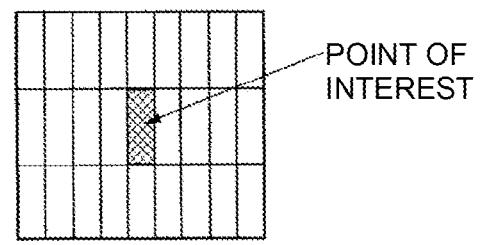

FIG. 2B is an explanatory diagram for describing a mask with a size of 9×3 to be used in a situation where resolution in the main-scanning direction is twice as high as that in the sub-scanning direction. In the example described below, the main-scanning resolution and the sub-scanning resolution are 600 dpi and 300 dpi, respectively.

In each of the mask patterns illustrated in FIGS. 2A and 2B, a region for detecting a portion on which the jaggy correction (the contour portion correction processing) is to be performed is set in accordance with a ratio of resolutions of image data. Detection size is represented by a fixed area.

The fixed area is divided according to the ratio between the main-scanning resolution and the sub-scanning resolution.

More specifically, when the main-scanning resolution and sub-scanning resolution are 300 dpi and 600 dpi, respectively, as in the example illustrated in FIG. 2A, the ratio between the main-scanning resolution and the sub-scanning resolution is 1:2. Accordingly, the setting is made such that it is satisfied that the row and the column containing a point of interest+the mask size in the main-scanning direction:the mask size in the sub-scanning direction is 1:2.

As described above, FIG. 2A illustrates an example of the mask with a size of 3×5 which is calculated as follows:

the number of columns in the main-scanning direction: (the column containing the point of interest)+2=3, and the number of rows in the sub-scanning direction: (the row containing the point of interest)+4=5.

Meanwhile, because it is enough that the ratio is satisfied, the size of a mask can be set to a size of 4×6 according to the following calculation:

the number of columns in the main-scanning direction: (the column containing the point of interest)+3=4, and the number of rows in the sub-scanning direction: (the row containing the point of interest)+6=6.

When the main-scanning resolution and the sub-scanning resolution are 600 dpi and 300 dpi, respectively, as in the example illustrated in FIG. 2B, the ratio between the main-scanning resolution and the sub-scanning resolution is 2:1. Accordingly, the setting is made such that it is satisfied that the row and the column containing a point of interest+the mask size in the main-scanning direction:the mask size in the sub-scanning direction is 2:1.

As described above, FIG. 2B illustrates an example of the mask with a size of 9×3 which is calculated as follows:

the number of columns in the main-scanning direction: (the column containing the point of interest)+8=9, and the number of rows in the sub-scanning direction: (the row containing the point of interest)+2=3.

Note that, also in this case, the different sizes of the mask at the ration can be set.

Processing for determining whether or not to perform the first jaggy correction on a step-like contour portion detected as a correction portion from the angle of an oblique line of the step-like contour portion is described below with reference to FIGS. 3A and 3B.

Figure 3A:
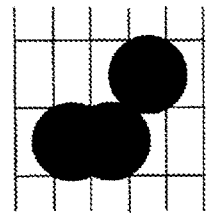
FIGS. 3A and 3B are explanatory diagrams for describing processing for determining whether or not to perform a first jaggy correction on a step-like contour portion detected as a correction portion from the angle of an oblique line of the step-like contour portion.

FIG. 3A illustrates a dot arrangement of an oblique line formed with two dots in the main-scanning direction and one dot in the sub-scanning direction. FIG. 3B illustrates a dot arrangement of an oblique line formed with four dots in the main-scanning direction and one dot in the sub-scanning direction.

If the main-scanning resolution and the sub-scanning resolution are 600 dpi and 300 dpi (i.e., the main-scanning resolution is twice as high as the sub-scanning resolution), respectively, as illustrated in FIG. 3A, the angle between the oblique line formed with two dots in the main-scanning direction and one dot in the sub-scanning direction and a horizontal line parallel to the main-scanning direction is 30 degrees. As illustrated in FIG. 3B, the angle of the oblique line formed with four dots in the main-scanning direction and one dot in the sub-scanning direction is approximately 15 degrees.

Thus, so long as the resolutions are known, the angle of the oblique line can be determined simultaneously with the pattern matching that is performed to detect a correction portion.

Accordingly, when the first jaggy correction is to be performed on every oblique line with an angle equal to or smaller than 30 degrees, whether or not to perform the first jaggy correction can be determined by setting the pattern illustrated in FIG. 3A.

Figure 3B:
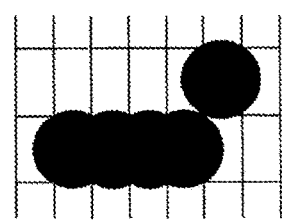

When the first jaggy correction is to be performed on every oblique line with an angle equal to or smaller than 15 degrees, whether or not to perform the first jaggy correction can be determined by setting the pattern illustrated in FIG. 3B.

In this way, depending on a target system, a correction portion on which the first jaggy correction according to the embodiment is to be performed can be determined with respect to an optimal oblique-line angle.

Processing for determining whether or not to perform the first jaggy correction on a step-like contour portion detected as a correction portion from the thickness of an oblique line of the step-like contour portion is described below with reference to FIGS. 4A and 4B.

Figure 4A:
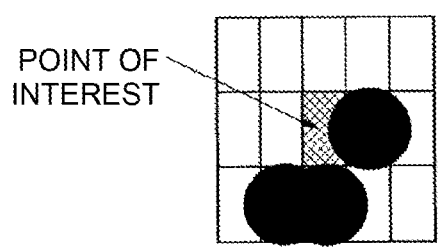
FIGS. 4A and 4B are flowcharts for describing processing for determining whether or not to perform the first jaggy correction on a step-like contour portion detected as a correction portion from the thickness of an oblique line of the step-like contour portion.

FIG. 4A illustrates an example of a mask pattern for detecting presence of an oblique line below a point of interest. When this mask pattern is used, the first jaggy correction is performed on an oblique line below the point of interest regardless of the thickness of the line.

Figure 4B:
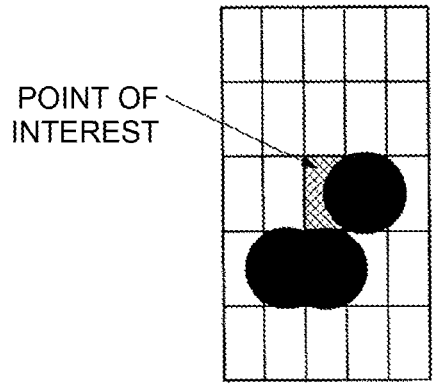

FIG. 4B illustrates an example of a mask pattern for detecting presence of an oblique line of only one dot below a point of interest. When this mask pattern is used, the first jaggy correction is performed on an oblique line below the point of interest only when the thickness of the oblique line is one dot.

An oblique line the thickness of which is two dots is also detectable by using a mask pattern with a size of 5×7.

Also here, it is assumed that the main-scanning resolution and the sub-scanning resolution are 600 dpi and 300 dpi, respectively. In this case, the main-scanning resolution is twice as high as the sub-scanning resolution.

Thus, so long as the thickness of an oblique line and the resolutions are known, whether or not to perform the first jaggy correction can be determined simultaneously with the pattern matching that is performed to detect a correction portion.

Meanwhile, whether or not addition of a small dot at a correction target pixel as the jaggy correction results in a bump-like lump formed with ink depends on characteristics of the apparatus and type of the medium.

However, by performing the processing described above with reference to FIGS. 3A to 4B for detecting an oblique line on which the first jaggy correction is to be performed, a line on which the first jaggy correction is to be performed can be selected according to characteristics of the target apparatus and type of the medium. As a result, because the jaggy correction (i.e., addition of a small dot) can be performed only on a portion which actually requires the processing, waste of processing time can be prevented.

The first jaggy correction is described below with reference to FIGS. 5A and 5B.

Figure 5A:
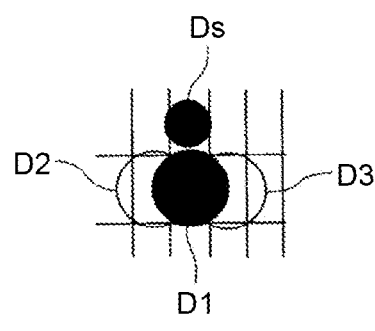
FIGS. 5A and 5B are explanatory diagrams for describing the first jaggy correction.

FIG. 5A illustrates an example where the main-scanning resolution is higher than the sub-scanning resolution. FIG. 5B illustrates an example where the sub-scanning resolution is higher than the main-scanning resolution.

In the first jaggy correction, a small dot is added at a correction target pixel. Thereafter, the presence or absence of an excessive dot is determined by performing the processing described below, and deletion of an excessive dot is performed as necessary.

Figure 5B:
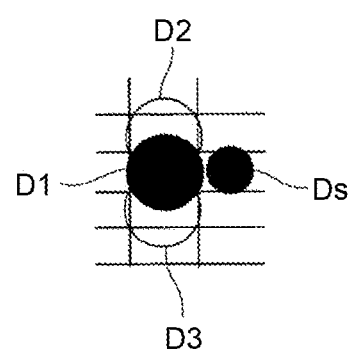

Referring to FIGS. 5A and 5B, the pixel at which a dot D1 is arranged and which is adjacent to the correction target pixel, at which a small dot Ds is added by the jaggy correction, is defined as a "portion under determination" (pixel of interest).

Whether or not a dot is arranged at a pixel (the pixels of hollow dots D2 and D3) adjacent to the pixel of interest (the pixel of the dot D1) in the direction of higher resolution (which is the lateral direction in FIG. 5A; the vertical direction in FIG. 5B).

If a dot is arranged at a pixel adjacent to the pixel of interest, a dot at the pixel of interest is deleted. The reason therefor is as follows. Because the number of dots near the pixel of interest is too large, addition of a small dot will result in a bump-like lump formed with ink.

By not only adding a dot at an oblique line with a small angle in a low-resolution image in which main-scanning resolution and sub-scanning resolution differ from each other but also deleting an excessive dot in this manner, effective jaggy correction in a character or a line containing an oblique line can be performed without adverse effect such as occurrence of a jaggy or a bump-like lump formed with ink.

Jaggy corrections of Comparative Examples are described below with reference to FIGS. 6A through 9B to make the advantage provided by the contour portion correction according to the embodiment more explicit.

In the jaggy corrections of Comparative Example 1 illustrated in FIGS. 6A to 7B, the small dots Ds are added at the pixels adjacent to a stair-like step portion.

Figure 6A:
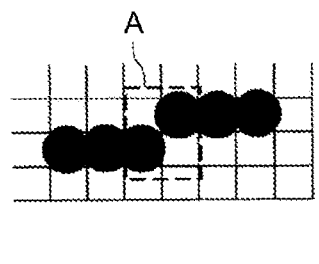
FIGS. 6A and 6B are explanatory diagrams for describing a jaggy correction of Comparative Example 1.
Figure 6B:
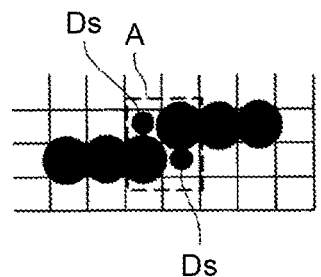

FIGS. 6A and 6B illustrate an example where the main-scanning resolution and the sub-scanning resolution are equal to each other. Adding the dots Ds at a stair-like step portion A of the image illustrated in FIG. 6A as illustrated in FIG. 6B changes the thickness of a character or a line, thereby producing a bump-like lump formed with ink in the region of the stair-like step portion A.

Figure 7A:
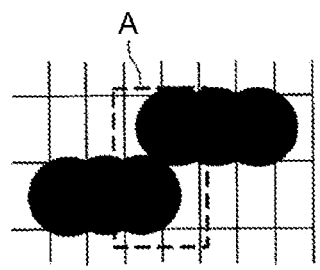
FIGS. 7A and 7B are explanatory diagrams for describing the jaggy correction of Comparative Example 1 in a situation where main-scanning resolution and sub-scanning resolution differ from each other.
Figure 7B:
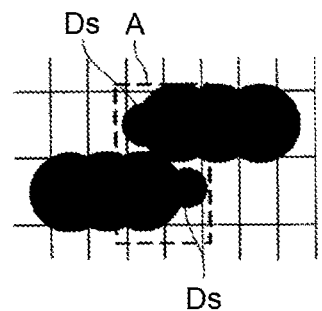

FIGS. 7A and 7B illustrate an example where the main-scanning resolution and the sub-scanning resolution differ from each other. Adding the dots Ds at the stair-like step portion A of the image illustrated in FIG. 7A as illustrated in FIG. 7B changes the thickness of the character or line, thereby producing a bump-like lump formed with ink in the region of the stair-like step portion A in a similar manner.

Figure 8A:
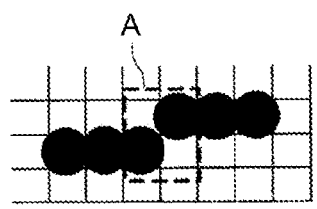
FIGS. 8A and 8B are explanatory diagrams for describing a jaggy correction of Comparative Example 2.
Figure 8B:
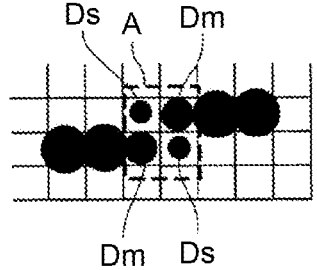

In Comparative Example 2 illustrated in FIGS. 8A and 8B, an attempt to alleviate this problem by replacing large dots at which the dots Ds are to be added in the stair-like step portion A, with, for example, medium dots Dm is made.

Figure 9A:
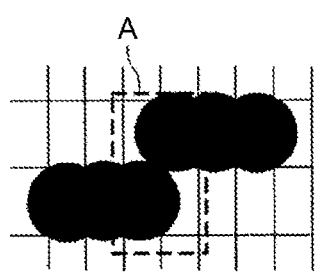
FIGS. 9A and 9B are explanatory diagrams for describing the jaggy correction of Comparative Example 2 in a situation where main-scanning resolution and sub-scanning resolution differ from each other.
Figure 9B:
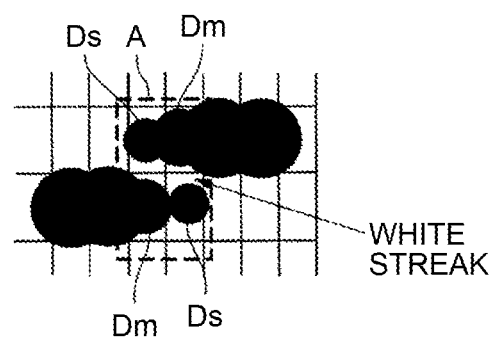

However, this approach of Comparative Example 2 is disadvantageous for images in which the main-scanning resolution and the sub-scanning resolution differ from each other as illustrated in FIG. 9A. This is because a large gap can be provided between the replaced dots Dm and the added dots Ds, causing a white streak to appear in the region of the stair-like step portion A as illustrated in FIG. 9B.

Thus, each of the jaggy corrections of Comparative Examples 1 and 2 can deteriorate image quality.

By contrast, according to the embodiment described above, not only addition of a dot but also deletion of an excessive dot are performed. Accordingly, effective jaggy correction in a character or a line containing an oblique line can be performed without adverse effect such as occurrence of a jaggy or a bump-like lump formed with ink.

Figure 10:
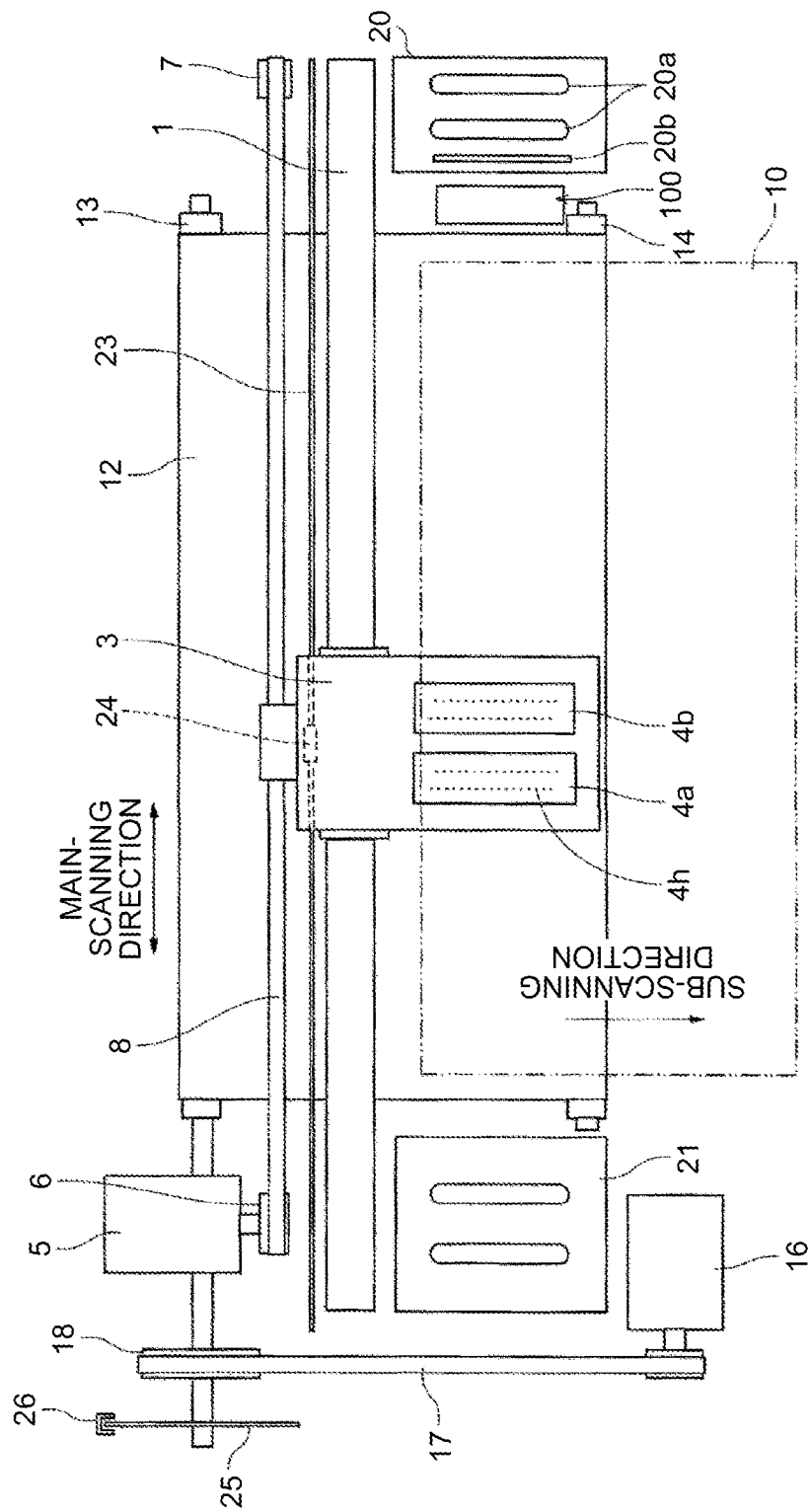
FIG. 10 is an explanatory plan view illustrating an example of an image forming apparatus according to an embodiment of the present invention.

An example of an image forming apparatus according to an embodiment of the present invention including a program according to an embodiment of the present invention is described below with reference to FIG. 10. FIG. 10 is an explanatory plan view of the image forming apparatus.

The image forming apparatus is a serial-type inkjet recording apparatus. In the image forming apparatus, a carriage 3 is movably supported by a main guide member 1 laterally bridged between side plates (not shown) on the right and left and a sub guide member (not shown). The carriage 3 is driven by a main-scanning motor 5 to reciprocate in the main-scanning direction (carriage moving direction) via a timing belt 8 supported on and around a drive pulley 6 and a driven pulley 7.

The carriage 3 includes recording heads 4a and 4b (which may be referred to as the "recording heads 4" when not discriminating these) which are liquid ejection heads. The recording heads 4 eject droplets of respective colors which are, for example, yellow (Y), cyan (C), magenta (M), and black (K). The recording heads 4 include nozzle rows 4n made up of a plurality of nozzles arranged in the sub-scanning direction perpendicular to the main-scanning direction. The recording heads 4 are mounted in an orientation for ejecting droplets downward.

Each of the recording heads 4 includes two nozzle rows in which a plurality of nozzles are aligned. For instance, one of the nozzle rows of the recording head 4a may eject droplets of black (K), while the other nozzle row may eject droplets of cyan (C). One of the nozzle rows of the recording head 4b may eject droplets of magenta (M), while the other nozzle row may eject droplets of yellow (Y).

Examples of the liquid ejection head used as the recording head 4 include a piezoelectric actuator such as a piezoelectric element or a thermal actuator. The thermal actuator utilizes phase transition caused by liquid film boiling by using an electro-thermal conversion element such as a heating resistor.

The image forming apparatus includes a conveyance belt 12 which is a conveyance unit that conveys the sheet 10 at a position facing the recording heads 4 while performing electrostatic adsorption on the sheet 10. The conveyance belt 12 is an endless belt supported on and around a conveyance roller 13 and a tension roller 14.

The conveyance belt 12 is revolved in the sub-scanning direction by rotation of the conveyance roller 13 that is driven to rotate by a sub-scanning motor 16 via a timing belt 17 and a timing pulley 18. A charging roller (not shown) charges (deposits charges on) the conveyance belt 12 that is being revolved.

A maintenance/recovery mechanism 20 which performs maintenance/recovery of the recording heads 4 is arranged at a position at one side of the conveyance belt 12 with respect to the main-scanning direction of the carriage 3. A dummy ejection receptacle 21 for receiving droplets ejected as dummy ejection from the recording heads 4 is arranged at a position at the other side of the conveyance belt 12 with respect to the same.

The maintenance/recovery mechanism 20 includes, for example, cap members 20a for capping nozzle faces (faces where the nozzles are provided) of the recording heads 4, a wiper member 20b for wiping the nozzle faces, and a dummy ejection receptacle (not shown) for receiving droplets ejected for purpose other than image forming.

An ejection detector 100 is arranged between the conveyance belt 12 and the maintenance/recovery mechanism 20 in an area which is outside a recording region and at which the ejection detector 100 can face the recording heads 4.

An encoder scale 23, on which a predetermined pattern is formed, is mounted on the side plates in a tensioned manner along the main-scanning direction of the carriage 3. An encoder sensor 24 which is a transmission-type photosensor for reading the pattern on the encoder scale 23 is mounted on the carriage 3. The encoder scale 23 and the encoder sensor 24 make up a linear encoder (main-scanning encoder) for detecting travel of the carriage 3.

A code wheel 25 is attached to the shaft of the conveyance roller 13. An encoder sensor 26 which is a transmission-type photosensor for detecting a pattern formed on the code wheel 25 is provided. The code wheel 25 and the encoder sensor 26 make up a rotary encoder (sub-scanning encoder) for detecting a moved distance and a moving position of the conveyance belt 12.

In the image forming apparatus configured as described above, the sheet 10 is fed from a paper feeding tray (not shown) onto the charged conveyance belt 12 and adsorbed thereto. The sheet 10 is conveyed in the sub-scanning direction by the revolving motion of the conveyance belt 12.

One line is recorded by driving the recording heads 4 in accordance with an image signal, thereby ejecting ink droplets onto the sheet 10 that is at rest, while moving the carriage 3 in the main-scanning direction. After conveying the sheet 10 a predetermined amount, the next line is recorded. Upon receiving an end-of-recording signal or a signal indicating that the trailing end of the sheet 10 has reached the recording region, the image forming apparatus ends the recording operation and discharges the sheet 10 onto a paper ejection tray (not shown).

An outline of a control unit of the image forming apparatus is described below with reference to FIG. 11. FIG. 11 is an explanatory block diagram of the control unit.

The control unit 500 includes a main control unit 500A which includes a CPU 501, a ROM 502, and a RAM 503. The CPU 501 provides overall control of the apparatus. The ROM 502 stores a program including the program according to the embodiment, to be executed by the CPU 501 and other fixed data. The RAM 503 temporarily stores image data and the like.

The control unit 500 further includes a host I/F 506, an image-output control unit 511 which controls driving of the recording heads 4, and an encoder analyzing unit 512. The host I/F 506 manages data transfer to and from a host (information processing apparatus) 600 such as a PC. The encoder analyzing unit 512 receives detection signals output from the main-scanning encoder sensor 24 and the sub-scanning encoder sensor 26 and analyzes the detection signals.

The control unit 500 further includes a main-scanning-motor drive unit 513 which drives the main-scanning motor 5, a sub-scanning-motor drive unit 514 which drives the sub-scanning motor 16, and an I/O 516 for various sensors and actuators 517.

The control unit 500 further includes an ejection detecting unit 531 which determines whether or not droplets are ejected using the ejection detector 100.

The image-output control unit 511 includes a data generation unit which generates print data, a drive-waveform generation unit which generates a drive waveform for controlling driving of the recording heads 4, and a data transfer unit which transfers a head control signal and the print data. The head control signal is a signal for selecting a required drive signal from the drive waveform.

The image-output control unit 511 outputs the drive waveform, the head control signal, the print data, and the like to a head driver 510, thereby causing droplets to be ejected from the nozzles of the recording heads 4 in accordance with the print data. The head driver 510 is a head drive circuit for driving the recording heads 4 mounted on the carriage 3.

The encoder analyzing unit 512 includes a direction detecting unit 520 which detects a moving direction based on the detection signals and a counter unit 521 which detects moved distances.

The control unit 500 controls travel of the carriage 3 by controlling driving of the main-scanning motor 5 via the main-scanning-motor drive unit 513 based on a result of analysis output from the encoder analyzing unit 512. The control unit 500 controls feed of the sheet 10 by controlling driving of the sub-scanning motor 16 via the sub-scanning-motor drive unit 514.

The main control unit 500A of the control unit 500 detects droplet ejection from the recording heads 4 by performing control as follows. The main control unit 500A causes the recording heads 4 to move and eject droplets from target nozzles of the recording heads 4, and determines a droplet ejection state from a detection signal output from the droplet-ejection detecting unit 531.

In the control unit 500, the contour portion correction processing according to the embodiment described above is stored in the ROM 502 as a program and the CPU 501 causes the contour portion correction processing to be performed.

In the example described above, the contour portion correction processing according to the embodiment is performed in the image forming apparatus. An alternative configuration in which a printer driver 601, for example, of the host 600 illustrated in FIG. 11 performs the contour portion correction processing may be employed. In this alternative configuration, the host 600 corresponds to the image processing apparatus according to the embodiment.

The program which, when executed by a computer, causes the computer to perform the contour portion correction processing according to the embodiment may be provided by downloading or the like.

The term "sheet" as used herein is not limited to sheets made from paper but includes any sheet of overhead transparency film, fabric, glass, substrate, or the like onto which droplets of ink, other liquid, or the like can be deposited. The "sheet" as used herein includes what may be referred to as a to-be-recorded medium, a recording medium, recording paper, a recording sheet, or the like. The terms "image forming", "recording", and "printing" are used as synonyms herein.

The term "image forming apparatus" as used herein includes any apparatus configured to form an image by ejecting liquid onto a medium which may be paper, thread, fiber, textile, leather, metal, plastic, glass, wood, or ceramic, for example. The term "image forming" as used herein is not limited to forming an image of a character, a figure, or the like that carries some information on a medium but includes forming an image such as a pattern that carries no information on a medium (in other words, simply depositing droplets on the medium).

The term "ink" as used herein is not limited to, unless otherwise specified, what may be referred to as ink but includes any liquid, such as what may be referred to as recording liquid, fixing liquid, and liquid, with which an image can be formed. Examples of the liquid include DNA samples, resist materials, patterning materials, and resins.

The term "image" as used herein is not limited to two-dimensional images but includes images formed on a three-dimensional (3D) object and 3D objects formed by 3D printing.

Unless otherwise specified, the image forming apparatus may be either a serial-type image forming apparatus or a line-type image forming apparatus.

According to an embodiment, image quality of an image in which the resolution in the main-scanning direction differs from that in the sub-scanning direction can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing method that generates image data for controlling a liquid-ejecting recording head to form, on an image recording medium, an image made up of a plurality of dots and having resolution in a first direction and resolution in a second direction, the second direction intersecting the first direction, the resolution in the first direction being higher than the resolution in the second direction, the image processing method comprising performing contour portion correction including
    (a) adding image data corresponding to a dot to be formed by the liquid-ejecting recording head at a correction target pixel on the image recording medium, the correction target pixel being a pixel adjacent to a step-like contour portion in the image, and
    (b) when a dot is to be formed at a pixel adjacent to a pixel of interest in the first direction having the higher resolution than that in the second direction, deleting image data corresponding to the dot at the pixel of interest, the pixel of interest being adjacent to the correction target pixel in the second direction having a lower resolution than that in the first direction.

2. The image processing method according to claim 1, wherein the deleting the image data corresponding to the dot at the pixel of interest is performed in (b) when the step-like contour portion corresponds to an oblique line with an angle equal to or smaller than a predetermined angle.

3. The image processing method according to claim 1, wherein the deleting the image data corresponding to the dot at the pixel of interest is performed in (b) when the contour portion corresponds to an oblique line with a thickness equal to or smaller than a predetermined thickness.

4. The image processing method according to claim 1, wherein the step-like contour portion is detected by pattern matching using a mask pattern, the mask pattern depending on the resolutions.

5. The image processing method according to claim 1, wherein whether or not to perform the contour portion correction is determined based on color of the image.

6. The image processing method according to claim 1, wherein the contour portion correction further includes:
    (c) defining a pixel at which the dot is to be formed and which is adjacent to the correction target pixel in the second direction as the pixel of interest; and
    (d) determining whether the dot is to be formed at the pixel adjacent to the pixel of interest,
    wherein the image data corresponding to the dot at the pixel of interest is deleted in (b) when it is determined in (d) that the dot is to be formed at the pixel adjacent to the pixel of interest in the first direction.

7. The image processing method according to claim 1, wherein the dot formed at the correction target pixel is a small dot that is smaller than the dot at the pixel of interest.

8. An image processing apparatus that generates image data for controlling a liquid-ejecting recording head to form, on an image recording medium, an image made up of a plurality of dots and having resolution in a first direction and resolution in a second direction, the first direction intersecting the second direction, the resolution in the first direction being higher than the resolution in the second direction, the image processing apparatus being configured to perform contour portion correction including:
    adding image data corresponding to a dot to be formed by the liquid-ejecting recording head at a correction target pixel on the image recording medium, the correction target pixel being a pixel adjacent to a step-like contour portion in the image, and
    when a dot is to be formed at a pixel adjacent to a pixel of interest in the first direction having the higher resolution than that in the second direction, deleting image data corresponding to the dot at the pixel of interest, the pixel of interest being adjacent to the correction target pixel in the second direction having a lower resolution than that in the first direction.

9. A computer program product comprising a non-transitory computer-readable medium containing an information processing program, the program causing a computer to perform image processing that generates image data for controlling a liquid-ejecting recording head to form, on an image recording medium, an image made up of a plurality of dots and having resolution in a first direction and resolution in a second direction intersecting the first direction, the resolution in the first direction being higher than the resolution in the second direction, the image processing comprising performing contour portion correction including:
    adding image data corresponding to a dot to be formed by the liquid-ejecting recording head at a correction target pixel on the image recording medium, the correction target pixel being a pixel adjacent to a step-like contour portion in the image, and
    when a dot is to be formed at a pixel adjacent to a pixel of interest in the first direction having the higher resolution than that in the second direction, deleting image data corresponding to a dot at the pixel of interest, the pixel of interest being adjacent to the correction target pixel in the second direction having a lower resolution than that in the first direction.

* * * * *